US011798278B2

(12) United States Patent
Tang et al.

(10) Patent No.: US 11,798,278 B2
(45) Date of Patent: Oct. 24, 2023

(54) METHOD, APPARATUS, AND STORAGE MEDIUM FOR CLASSIFYING MULTIMEDIA RESOURCE

(71) Applicant: TENCENT TECHNOLOGY (SHENZHEN) COMPANY LIMITED, Shenzhen (CN)

(72) Inventors: Yongyi Tang, Shenzhen (CN); Lin Ma, Shenzhen (CN); Wei Liu, Shenzhen (CN); Lianqiang Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 379 days.

(21) Appl. No.: 17/034,090

(22) Filed: Sep. 28, 2020

(65) Prior Publication Data
US 2021/0011942 A1 Jan. 14, 2021

Related U.S. Application Data

(63) Continuation of application No. PCT/CN2019/101298, filed on Aug. 19, 2019.

(30) Foreign Application Priority Data

Sep. 3, 2018 (CN) .......................... 201811022608.9

(51) Int. Cl.
*G06F 16/00* (2019.01)
*G06V 20/40* (2022.01)
(Continued)

(52) U.S. Cl.
CPC ............ *G06V 20/41* (2022.01); *G06F 16/435* (2019.01); *G06F 16/45* (2019.01); *G06F 16/48* (2019.01);
(Continued)

(58) Field of Classification Search
CPC ........ G06F 16/45; G06F 16/435; G06F 16/48; G06K 9/6218; G06K 9/6232;
(Continued)

(56) References Cited

U.S. PATENT DOCUMENTS

2014/0368688 A1* 12/2014 John Archibald ... G06K 9/6218
348/222.1
2017/0259121 A1 9/2017 King et al.
(Continued)

FOREIGN PATENT DOCUMENTS

CN 101894170 A 11/2010
CN 104679902 A 6/2015
(Continued)

OTHER PUBLICATIONS

Chinese Office Action with English concise explanation of relevance regarding 201811022608.9 dated Sep. 20, 2022.
(Continued)

*Primary Examiner* — Paul Kim
(74) *Attorney, Agent, or Firm* — Crowell & Moring, L.L.P.

(57) ABSTRACT

The present disclosure describes a method, apparatus, and storage medium for classifying a multimedia resource. The method includes obtaining a multimedia resource. extracting a plurality of features of the multimedia resource; clustering the plurality of features to obtain at least one cluster set, and determining cluster description information of each cluster set, the each cluster set comprising at least one feature of the multimedia resource; determining at least one piece of target feature description information of the multimedia resource based on the cluster description information of each cluster set, each piece of target feature description information being used for representing an association between one piece of cluster description information and the remaining
(Continued)

cluster description information; and classifying the multimedia resource based on the at least one piece of target feature description information of the multimedia resource, to obtain a classification result of the multimedia resource.

18 Claims, 7 Drawing Sheets

(51) Int. Cl.
| | | |
|---|---|---|
| G06F 16/435 | (2019.01) | |
| G06F 16/45 | (2019.01) | |
| G06F 16/48 | (2019.01) | |
| G06F 18/23 | (2023.01) | |
| G06V 10/762 | (2022.01) | |
| G06V 10/764 | (2022.01) | |
| G06V 10/77 | (2022.01) | |
| G06V 10/82 | (2022.01) | |

(52) U.S. Cl.
CPC ............ *G06F 18/23* (2023.01); *G06V 10/763* (2022.01); *G06V 10/764* (2022.01); *G06V 10/7715* (2022.01); *G06V 10/82* (2022.01)

(58) Field of Classification Search
CPC .. G06K 9/6221; G06V 10/763; G06V 10/764; G06V 10/7715; G06V 10/82; G06V 20/41
See application file for complete search history.

(56) References Cited

U.S. PATENT DOCUMENTS

| | | |
|---|---|---|
| 2017/0278546 A1 | 9/2017 | Xiao et al. |
| 2018/0028079 A1 | 2/2018 | Gurevich et al. |

FOREIGN PATENT DOCUMENTS

| | | |
|---|---|---|
| CN | 105468781 A | 4/2016 |
| CN | 106446950 A | 2/2017 |
| CN | 106779073 A | 5/2017 |
| CN | 108009228 A | 5/2018 |
| CN | 109299315 A | 2/2019 |

OTHER PUBLICATIONS

Yanxing Yuan et al., "Research on efficient classification and storage technology of mass data in educational multimedia," with English abstract, Modern electronic technology, vol. 8, Apr. 15, 2017.
Extended European Search Report regarding EP19857869.2 dated Sep. 8, 2021.
Girdhar et al., "ActionVLAD: Learning spatio-temporal aggregation for action classification," arxiv.org, Cornell University, Ithaca, NY, Apr. 10, 2017.
Arandjelovic et al., "NetVLAD: CNN Architecture for Weakly Supervised Place Recognition," 2016 IEEE Conference on Computer Vision and Pattern Recognition (CVPR), IEEE, Jun. 27, 2016.
Miech et al., "Learnable pooling with Context Gating for video classification," arxiv.org, Cornell University Library, Cornell University, Ithaca, NY, Jun. 21, 2017.
International Search Report with English translation and Written Opinion regarding PCT/CN2019/101298 dated Nov. 22, 2019, 9 pages.
European Office Action dated Jul. 19, 2023 in corresponding European Patent Application No. 19 857 869.2.

\* cited by examiner

METHOD, APPARATUS, AND STORAGE MEDIUM FOR CLASSIFYING MULTIMEDIA RESOURCE

RELATED APPLICATION

This application is a continuation application of PCT Patent Application No. PCT/CN2019/101298, filed on Aug. 19, 2019, which claims priority to Chinese Patent Application No. 201811022608.9, filed with the China National Intellectual Property Administration on Sep. 3, 2018, both of which are incorporated herein by reference in their entireties.

FIELD OF THE TECHNOLOGY

This application relates to the field of computer technologies, and in particular, to a multimedia resource classification method and apparatus, a computer device, and a storage medium.

BACKGROUND OF THE DISCLOSURE

With the development of computer technologies, the computer device may automatically classify a multimedia resource, determine a type of the multimedia resource, and provide a multimedia service to a user according to the type of the multimedia resource. For example, a multimedia resource of a type that the user is interested in may be recommended to the user, to implement personalized recommendation, or multimedia resources may be screened based on the type, to screen out a multimedia resource that does not meet a requirement.

Currently, the multimedia resource may be classified based on a feature of the multimedia resource. When the computer device classifies the multimedia resource based on the feature, different features belonging to the same multimedia resource may be classified into different types, and accuracy of multimedia resource classification is reduced.

The present disclosure describes various embodiments for classifying one or more multimedia resource, addressing at least some of the issues/problems discussed above.

SUMMARY

According to various embodiments provided in this application, a multimedia resource classification method and apparatus, a computer device, and a storage medium are provided.

The present disclosure describes an embodiment of a method for classifying a multimedia resource. The method includes obtaining, by a device, a multimedia resource. The device includes a memory storing instructions and a processor in communication with the memory. The method further includes extracting, by the device, a plurality of features of the multimedia resource; clustering, by the device, the plurality of features to obtain at least one cluster set, and determining cluster description information of each cluster set, the each cluster set comprising at least one feature of the multimedia resource, and each piece of cluster description information being used for indicating a feature of one cluster set; determining, by the device, at least one piece of target feature description information of the multimedia resource based on the cluster description information of each cluster set, each piece of target feature description information being used for representing an association between one piece of cluster description information and the remaining cluster description information; and classifying, by the device, the multimedia resource based on the at least one piece of target feature description information of the multimedia resource, to obtain a classification result of the multimedia resource.

The present disclosure describes an embodiment of an apparatus for classifying a multimedia resource. The apparatus includes a memory storing instructions; and a processor in communication with the memory. When the processor executes the instructions, the processor is configured to cause the apparatus to: obtain a multimedia resource, extract a plurality of features of the multimedia resource, cluster the plurality of features to obtain at least one cluster set, and determine cluster description information of each cluster set, the each cluster set comprising at least one feature of the multimedia resource, and each piece of cluster description information being used for indicating a feature of one cluster set, determine at least one piece of target feature description information of the multimedia resource based on the cluster description information of each cluster set, each piece of target feature description information being used for representing an association between one piece of cluster description information and the remaining cluster description information, and classify the multimedia resource based on the at least one piece of target feature description information of the multimedia resource, to obtain a classification result of the multimedia resource.

The present disclosure describes an embodiment of a non-transitory computer readable storage medium storing computer readable instructions. The computer readable instructions, when executed by a processor, are configured to cause the processor to perform: obtaining a multimedia resource; extracting a plurality of features of the multimedia resource; clustering the plurality of features to obtain at least one cluster set, and determining cluster description information of each cluster set, the each cluster set comprising at least one feature of the multimedia resource, and each piece of cluster description information being used for indicating a feature of one cluster set; determining at least one piece of target feature description information of the multimedia resource based on the cluster description information of each cluster set, each piece of target feature description information being used for representing an association between one piece of cluster description information and the remaining cluster description information; and classifying the multimedia resource based on the at least one piece of target feature description information of the multimedia resource, to obtain a classification result of the multimedia resource.

A multimedia resource classification method is provided, performed by a computer device, the method including:
  obtaining a multimedia resource, and extracting a plurality of pieces of feature information of the multimedia resource;
  clustering the plurality of pieces of feature information to obtain at least one cluster set, and determining cluster description information of each cluster set, the each cluster set including at least one piece of feature information, and each piece of cluster description information being used for indicating a feature of one cluster set;
  determining at least one piece of target feature description information of the multimedia resource based on the cluster description information of each cluster set, each piece of target feature description information being used for representing an association between one piece of cluster description information and the remaining cluster description information; and classifying the multimedia resource based on the at least one piece of target feature description information of the multimedia resource, to obtain a classification result of the multimedia resource.

A multimedia resource classification apparatus is provided, including:

an obtaining module, configured to obtain a multimedia resource, and extract a plurality of pieces of feature information of the multimedia resource;

a clustering module, configured to cluster the plurality of pieces of feature information to obtain at least one cluster set, and determine cluster description information of each cluster set, the each cluster set including at least one piece of feature information, and each piece of cluster description information being used for indicating a feature of one cluster set;

a description module, configured to determine at least one piece of target feature description information of the multimedia resource based on the cluster description information of each cluster set, each piece of target feature description information being used for representing an association between one piece of cluster description information and the remaining cluster description information; and a classification module, configured to classify the multimedia resource based on the at least one piece of target feature description information of the multimedia resource, to obtain a classification result of the multimedia resource.

A computer device is provided, including a memory and a processor, the memory storing a computer-readable instruction, the computer-readable instruction, when executed by the processor, causing the processor to perform the operations of the foregoing multimedia resource classification method.

One or more non-volatile storage media storing a computer-readable instruction are provided, the computer-readable instruction, when executed by one or more processors, causing the one or more processors to perform the operations of the foregoing multimedia resource classification method.

Details of one or more embodiments of this application are provided in the accompanying drawings and descriptions below. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

To make the objectives, technical solutions, and advantages of this application clearer and more comprehensible, this application is further described in detail below with reference to the accompanying drawings and the embodiments. It is to be understood that the specific embodiments described herein are merely used for explaining this application, but are not intended to limit this application.

Figure 1:
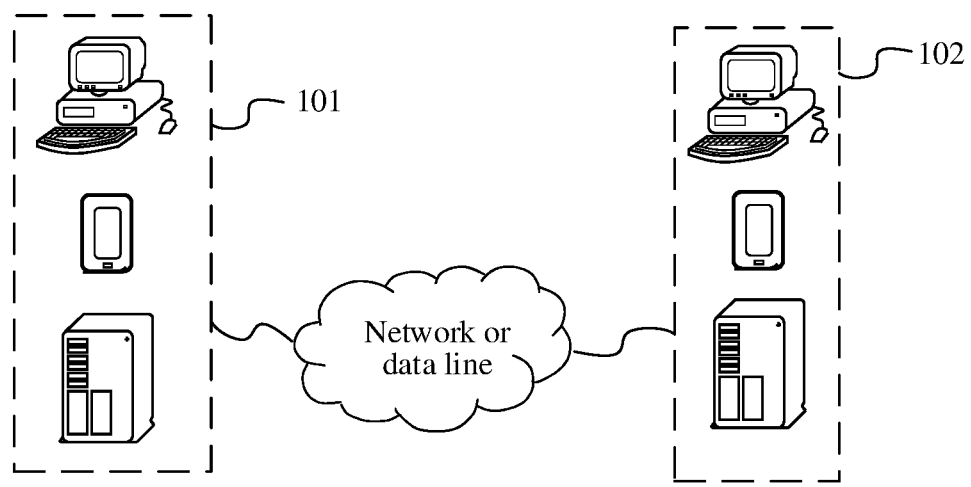
FIG. 1 is a diagram of an implementation environment according to an embodiment of this application.

FIG. 1 is a diagram of an implementation environment according to an embodiment of this application. The implementation environment may include at least one computer device 101. The computer device 101 may implement a multimedia resource classification method provided in the embodiments of this application. When the computer device 101 has a multimedia resource acquisition function, the computer device 101 may classify a multimedia resource acquired by the computer device 101. Certainly, the computer device 101 may also classify a stored multimedia resource.

Certainly, the computer device 101 may further be connected to a computer device 102 through a wireless or wired network, to provide a multimedia resource classification service for the computer device 102. The computer device 102 may acquire a multimedia resource, and when having a requirement for classifying the multimedia resource, the computer device 102 may send, as a service requester, the multimedia resource to the computer device 101.

There may further be at least one database in the computer device 101, and the database may be configured to store at least one of a to-be-classified multimedia resource or a classification result of a multimedia resource.

Specifically, the computer device 101 and the computer device 102 may both be terminals or servers. This is not limited in this embodiment of this application.

Figure 2:
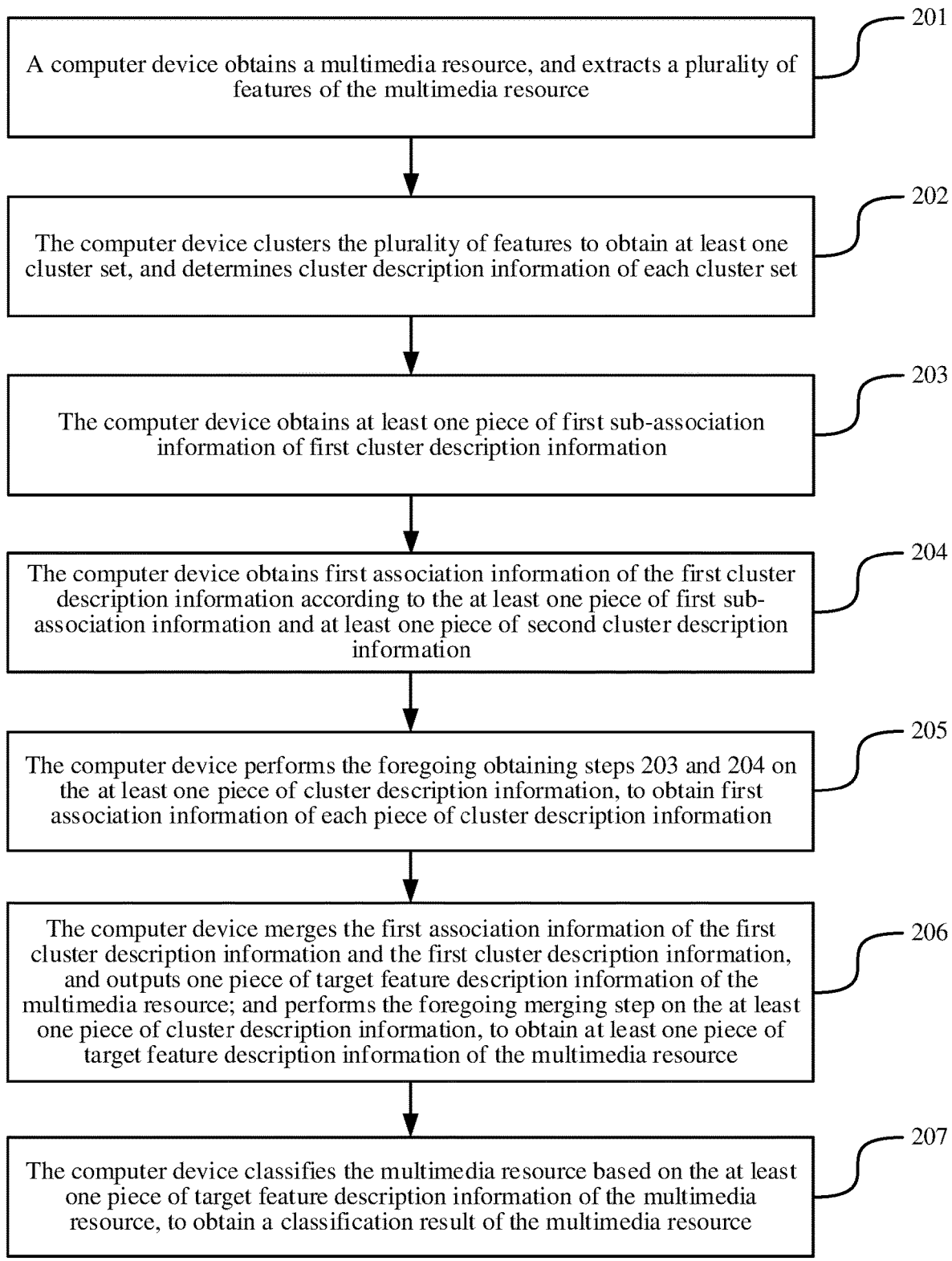
FIG. 2 is a flowchart of a multimedia resource classification method according to an embodiment of this application.

Referring to the flowchart of the multimedia resource classification method shown in FIG. 2, a processing procedure of the method may include the following steps:

201: A computer device obtains a multimedia resource, and extracts a plurality of features of the multimedia resource. In another implementation, a computer device obtains a multimedia resource, and extracts one or more feature of the multimedia resource.

The multimedia resource may be one or a combination of a plurality of a text, a sound, or an image. The plurality means at least two. For example, the multimedia resource may be a video resource or an audio resource. The computer device may classify an acquired multimedia resource in real time. Certainly, the computer device may also store the collected multimedia resource.

When the computer device provides a multimedia resource classification service for another computer device, each time receiving a to-be-classified multimedia resource, the computer device may trigger a multimedia resource classification process. Certainly, the computer device may also store the received multimedia resource.

In some embodiments, the computer device may further periodically obtain the stored multimedia resource, and classify the obtained multimedia resource. Alternatively, when receiving a multimedia resource classification instruction, the computer device may classify any to-be-classified multimedia resource, or classify a specified multimedia resource. How to trigger a multimedia resource classification process is not limited in this embodiment of this application.

In some embodiments, when classifying the multimedia resource, the computer device may invoke a preset feature extraction algorithm to perform feature extraction on the to-be-classified multimedia resource, to obtain a plurality of features. Any feature of the plurality of features may be a feature vector, a feature matrix, or the like. In this embodiment of this application, an example is used in which the feature is a feature vector. For example, the feature extraction algorithm may be a local binary pattern (LBP) feature extraction algorithm, a histogram of oriented gradient (HOG) feature extraction algorithm, a convolutional neural network, a recursive neural network, or the like. The specifically used feature extraction algorithm is not limited in this embodiment of this application.

202: The computer device clusters the plurality of features to obtain at least one cluster set, and determines cluster description information of each cluster set.

Similar feature may be classified into a cluster set through clustering processing. The cluster set may include at least one feature. A similarity between any two features in the same cluster set is higher than a similarity between any two features in different cluster sets. The cluster description information may be used for indicating a feature of a cluster set. When a cluster set is described by using the cluster description information, information redundancy brought by similar feature may be reduced.

In some embodiments, step 202 specifically includes the following steps:

Step A: The computer device determines at least one cluster center in the plurality of features.

During cluster analysis, the computer device may randomly select at least feature as the cluster center, and then calculate a similarity between each feature and the cluster center. For example, when the feature is a feature vector, the similarity may be related to a distance between feature vectors. The quantity of cluster sets may be preset according to a requirement. In one implementation, the shorter of the distance between two feature vectors, the closer or the higher of the similarity between the two features.

Step B: The computer device determines at least one initial cluster set based on the at least one cluster center.

Cluster sets may be in a one-to-one correspondence to cluster centers. For each feature, the computer device may obtain a cluster center having a highest similarity to the feature, and then add the feature to the cluster set of the cluster center. The foregoing processing is performed on each feature, to obtain the at least one initial cluster set. After obtaining each initial cluster set, the computer device may calculate a feature mean (or a feature average value) of each cluster set. For example, when the feature is a feature vector, an average value of norms of the feature vectors in the cluster set may be calculated, and the average value is used as the feature mean.

Step C: The computer device adjusts each initial cluster set, to obtain at least one cluster set after the adjustment.

For each initial cluster set, the computer device may obtain a feature vector most approximate to the feature mean of the cluster set, and set the feature vector as the cluster center of the cluster set. The foregoing process is repeated, and the feature in the cluster set is continuously adjusted until the cluster center does not change or another preset stop condition is met, to obtain a current cluster set.

In some embodiments, the computer device may also implement step A to step C based on another clustering algorithm. For example, the clustering algorithm may be a k-means algorithm or a k-medoids algorithm. A specific clustering algorithm is not limited in this embodiment of this application.

Step D: The computer device describes the at least one cluster set, to obtain the cluster description information of each cluster set.

After obtaining the cluster set, the computer device may invoke a preset cluster description algorithm to calculate the cluster description information of each cluster set. After cluster description is performed on the cluster set, a processing amount may be reduced through dimension reduction, so that processing efficiency may be improved.

For example, the cluster description algorithm may be a vector of network locally aggregated descriptor (NetVLAD) method.

After obtaining the cluster set and the cluster center therein, the computer device may calculate by using the following formula (1):

$$V_{NetVLAD}(d, k) = \sum_{n=1}^{N} \bar{a}_k(x^n)(x^n(d) - c^k(d)) \quad (1)$$

$V_{NetVLAD}(d,k)$ is a candidate value in the $d^{th}$ row and the $k^{th}$ column in a D*K matrix $V_{NetVLAD}$, and the matrix $V_{NetVLAD}$ is cluster description information of a cluster set. A value range of d is [1, D], and a value range of k is [1, K]. When d and k are arbitrary values, $V_{NetVLAD}(d,k)$ may represent a candidate value at any position in the matrix $V_{NetVLAD}$.

Input of formula (1) may be a plurality of feature vectors and cluster centers of a multimedia resource.

The feature vectors are N D-dimensional vectors $\{x^n\}_{n=1}^{N}$, that is, the plurality of features extracted in step 201. $x^n$ d is a value of the $d^{th}$ dimension of the vector $x^n$.

The cluster centers are K D-dimensional vectors $\{c^k\}_{k=1}^{K}$, and $c^k(d)$ is the $d^{th}$ dimension of the vector $c^k$. Correspondingly, the quantity of the cluster sets is also K, and each cluster set includes one cluster center $c^k$ and at least one vector $x^n$. Cluster description information of a cluster set may be represented as $V_{NetVLAD}(k)$, which is a D-dimensional vector.

$\bar{a}_k x^n$ is a weight of the vector $x^n$, a value range of the weight is [0, 1], and $$\bar{a}_k(x^n) = \frac{e^{\|x^n - c^k\|_2^2}}{\sum_{k'}^{K} e^{\|x^n - c^{k'}\|_2^2}} \cdot \|x^n - c^k\|_2^2$$

is a distance between $x^n$ and the cluster center $c^k$, and $$e^{\|x^n - c^k\|_2^2}$$

converts the distance into a Gaussian form, which is referred to as a Gaussian distance hereinafter. The Gaussian distance may avoid negative impact on a processing process in a case that the value is 0.

$$\sum_{k'}^{K} e^{\|x^n - c^{k'}\|_2^2}$$

is used for calculating a sum of Gaussian distances from $x^n$ to all cluster centers. $\bar{a}_k(x^n)$ represents a proportion of the Gaussian distance from $x^n$ to the cluster center $c^k$ in the sum of the Gaussian distances, that is, $\bar{a}_k(x^n)$ may be used for representing importance of the cluster center $c^k$ to $x^n$.

It can be learned from formula (1) that a candidate value of each dimension in the matrix $V_{NetVLAD}$ may be obtained by calculating a distance $x^n(d) - c^k(d)$ between each feature vector and a corresponding cluster center in the dimension and calculating a weighted sum of distances in the dimension. Therefore, the cluster description information $V_{NetVLAD}(k)$ of the cluster set may be used for representing a degree of attraction of the cluster center to each feature vector in the cluster set.

After the candidate value of each $V_{NetVLAD}(d,k)$ is determined, regularization processing may be performed on the matrix formed by $V_{NetVLAD}(d,k)$, to obtain the matrix $V_{NetVLAD}$, that is, the cluster description information $\{V_{NetVLAD}(k)\}_{k=1}^{K}$ of the cluster sets is obtained. Specific processing of regularization is not limited in this embodiment of this application.

203: The computer device obtains at least one piece of first sub-association information of first cluster description information.

Each piece of first sub-association information may be used for representing an association between the first cluster description information and one piece of second cluster description information. The first cluster description information is any one piece of cluster description information, and the second cluster description information is any one piece of information other than the first cluster description information in the at least one piece of cluster description information.

For example, the computer device may input any two pieces of cluster description information into the following formula (2), to calculate the first sub-association information:

$$f(v^i, v^j) = e^{\theta(v^i)^T \varphi(v^j)} \quad (2)$$

The cluster description information $\{V_{NetVLAD}(k)\}_{k=1}^{K}$ of the cluster sets is obtained in the foregoing process, and is simplified as $\{V^k\}_{k=1}^{K}$. In formula (2), any two vectors $v^i$ and $v^j$ in $\{V^k\}_{k=1}^{K}$ are used as input, $v^i$ and $v^j$ may be two different vectors, and a calculation result is the first sub-association information.

$\theta(v^i)^T$ is a transposed form of $\theta(v^i)$. $\theta(v^i)$ and $\varphi(V^j)$ are both linear mapping functions, and are defined as $\theta(v^i) W_\theta v^i$ and $\varphi(v^j) = W_\varphi v^j$. $W_\theta$ and $W_\varphi$ are both linear mapping coefficients, and the coefficients may be preset values. Certainly, when the non-local feature description method provided in this embodiment of this application is applied to a machine learning model, the coefficient may also be a learnable parameter, to be adjusted in a training process, so that a feature description capability is improved and the obtained feature description information is more representative.

$f(v^i, v^j)$ may be referred to as a non-local relationship function. Since $v^{i^T} v^j$ may represent mapping of $v^j$ on $v^i$, the first sub-association information calculated by $f(v^i, v^j)$ may carry mapping information of $v^j$ on $v^i$. Certainly, $f(v^i, v^j)$ may also have a plurality of different forms, for example, $f(v^i, v^j) = e^{v^{i^T} v^j}$ in a Gaussian form and $f(v^i, v^j) = v^{i^T} v^j$ in an inner product form. This is not limited in this embodiment of this application.

204: The computer device obtains first association information of the first cluster description information according to the at least one piece of first sub-association information and at least one piece of second cluster description information.

The first association information of the first cluster description information may be used for representing an association between the first cluster description information and all the remaining second cluster description information.

The computer device may obtain information about an association between any two pieces of cluster description information, that is, the foregoing first sub-association information. For one piece of cluster description information, the computer device may determine information about an association between the cluster description information and all the remaining cluster description information, that is, obtain first association information of the cluster description information, according to information about an association between the cluster description information and any one piece of cluster description information. In other words, cluster description information other than the cluster description information in the foregoing at least one piece of cluster description information is used as a whole, and the first association information may be used for representing an association between the cluster description information and the whole.

For example, the computer device may input the obtained at least one piece of first sub-association information and at least one piece of second cluster description information into the following formula (3), to calculate the first association information of the cluster description information:

$$y^i = \sum_{\forall j} f(v^i, v^j) g(v^j) \quad (3)$$

$g(v^j)$ is similar to $\theta(v^i)$, and is defined as $g(v^j) = W_g v^j$. $W_g$ is similar to $W_\varphi$.

$\forall j$ indicates that for all j, a variable j is removed by performing calculation on all j.

$$\sum_{\forall j} f(v^i, v^j) g(v^j)$$

is used for calculating a weighted sum of all $v^j$ for $v^i$, and a weight may be related to mapping of each $v^j$ on $v^i$. Therefore, $y^i$ may be used for representing an association between $v^i$ and all $v^j$, that is, first association information of $v^i$ is obtained.

205: The computer device performs steps 203 and 204 on the at least one piece of cluster description information, to obtain first association information of each piece of cluster description information.

For example, the first association information may be calculated for each $v^i$ by using the foregoing formula (3).

206: The computer device merges the first association information of the first cluster description information and the first cluster description information, and outputs one piece of target feature description information of the multimedia resource; and performs the foregoing merging step on the at least one piece of cluster description information, to obtain at least one piece of target feature description information of the multimedia resource.

The target feature description information may be in a one-to-one correspondence to the cluster description information. When the first association information is calculated, original information may be lost for conversion of the cluster description information. Therefore, the computer device may merge each piece of cluster description information and the first association information of the cluster description information, to obtain the target feature description information. The target feature description information may reserve information carried in the cluster description information and the first association information. That is, in addition to describing the feature of each cluster set in the multimedia resource, the target feature description information may further represent the association between each piece of cluster description information and the remaining cluster description information, so that the target feature description information is more representative.

For example, the computer device may input the obtained first association information of the first cluster description information and the first cluster description information into the following formula (4), to calculate the target feature description information:

$$\hat{v}^i = Wy^i + v^i \quad (4)$$

W is a weight coefficient of the first association information. Similar to the foregoing linear mapping coefficient, W may be a preset value or a learnable parameter.

A non-local feature descriptor $\hat{v}=[\hat{v}^1, \hat{v}^i, \ldots, \hat{v}^k]$ of the multimedia resource may be obtained by calculating $\hat{v}^i$ for each $v^i$, where $\hat{v}$ may be a D*K vector.

Certainly, according to an actual requirement, normalization processing may further be performed on the vectors in the foregoing process. For example, normalization processing is performed on each $y^i$ and/or $\hat{v}^i$. Using $y^i$ as an example, a normalization function may be Z(v), and is defined as $$Z(v) = \sum_{\forall i}\sum_{\forall j} f(v^i, v^j)g(v^j).$$

After the normalization, $$y^i = \frac{1}{Z(v)}\sum_{\forall j} f(v^i, v^j)g(v^j).$$

In this embodiment of this application, the vector on which normalization processing is performed and the specific normalization processing are not limited.

The foregoing steps 203 to 206 are an implementation of determining target feature description information. The first association information of the cluster description information may be used for indicating an association between the cluster description information and the remaining cluster description information. The association may be represented as a distance relationship between the cluster description information and the remaining cluster description information, a relationship of mapping of the remaining cluster description information on the cluster description information, and the like. This is not limited in this embodiment of this application. Therefore, the determining target feature description information by the computer device may be: determining, by the computer device for each piece of cluster description information, first association information of the each piece of cluster description information; and determining at least one piece of target feature description information of the multimedia resource based on the first association information of each piece of cluster description information.

When determining the first association information, the computer device may obtain information required for calculating the first association information, for example, a distance between the cluster description information and the remaining cluster description information, or mapping of the remaining cluster description information on the cluster description information, to calculate the first association information. Then, the computer device may further perform description by using the first association information, to obtain the at least one piece of target feature description information.

Certainly, the computer device may also describe an association between one piece of cluster description information and the remaining cluster description information based on another method. For example, the remaining cluster description information other than the cluster description information is summed, and then an outer product operation is performed on the cluster description information and a sum vector of the remaining cluster description information, to obtain target feature description information. That is, the target feature description information may be used for describing a normal vector of the cluster description information and the foregoing sum vector. Therefore, the determining target feature description information by the computer device may alternatively be: determining, by the computer device, at least one piece of target feature description information of the multimedia resource based on the cluster description information of each cluster set.

Each piece of target feature description information may be used for representing an association between one piece of cluster description information and the remaining cluster description information. The target feature description information is not limited to describing a cluster set, that is, the target feature description information is not limited to describing a local feature. Therefore, in this embodiment of this application, the target feature description information may be referred to as a non-local feature descriptor, and the process of obtaining at least one piece of target feature description information based on a plurality of features may be referred to as non-local feature description. For example, when the foregoing cluster description information is a NetVLAD, the target feature description information may be referred to as a non-local vector of network locally aggregated descriptor (NL-NetVLAD).

After obtaining the cluster description information of each cluster set, the computer device may further describe the cluster description information through the association between each piece of cluster description information and the remaining cluster description information, to obtain the target feature description information of the multimedia resource. Information of the multimedia resource may further be reserved through the foregoing processing, so that the target feature description information is more representative.

207: The computer device classifies the multimedia resource based on the at least one piece of target feature description information of the multimedia resource, to obtain a classification result of the multimedia resource.

A multimedia resource classification model may be preset in the computer device. The multimedia resource classification model may output the classification result of the multimedia resource based on at least one piece of inputted target feature description information. The multimedia resource classification model may be a multi-layer nonlinear network classification model, a multi-layer nonlinear network hybrid expert classification model, or the like. This is not limited in this embodiment of this application.

In some embodiments, the computer device may perform multi-category classification on the multimedia resource, and specific processing of the foregoing step 207 may be as follows: the computer device obtains a classification probability of at least one type based on the at least one piece of target feature description information of the multimedia resource, and determines a type whose classification probability is greater than a preset threshold as the classification result of the multimedia resource. The at least one type may be preset. For example, three types may be preset, which are respectively a landscape type, a person type, and a food type.

After obtaining the at least one piece of target feature description information of the multimedia resource, the computer device may invoke the multimedia resource classification model, input the at least one piece of target feature description information into the multimedia resource classification model, calculate the classification probability of each type, and then output a category of the multimedia resource according to the classification probability of each type, that is, obtain the classification result.

In some embodiments, there may be the following two manners for outputting the category of the multimedia resource according to the classification probability of each type:

In a first manner, the computer device may obtain a type whose classification probability is greater than a preset threshold. The preset threshold may be set according to a requirement, for example, the preset threshold may be 0.6. A type satisfying the condition is outputted as the classification result. There may be multimedia resources with rich content, so that there may be more than one type whose classification probability is greater than the preset threshold, and there is more than one correspondingly outputted classification result. The classification manner in which a plurality of types are outputted may be referred to as multi-category classification, and accuracy of multimedia resource classification can be improved in this implementation. For example, classification probabilities of the foregoing three types may be [0.1, 0.9, 0.7], indicating that the probability of the multimedia resource being the landscape type is 0.1, the probability of the person type is 0.9, and the probability of the food type is 0.7. When the preset threshold is 0.6, the person type and the food type may be outputted.

In a second manner, the computer device may output a category having a highest classification probability, that is, obtain one classification result. The classification manner in which one category is outputted may be referred to as single-category classification. For example, when the classification probabilities of the foregoing three types are respectively [0.1, 0.3, 0.6], the food type is outputted.

A range of the classification probability of each type may be [0, 1]. However, a sum of the classification probabilities of the types may be 1, or may be another value. This is not limited in this embodiment of this application.

In this embodiment of this application, when classifying the multimedia resource, the computer device may cluster a plurality of features of the multimedia resource to obtain at least one cluster set, then describe each cluster set by using cluster description information, and further describe the cluster description information based on an association between the cluster description information, to obtain target feature description information. In addition to describing a feature of each cluster set in the multimedia resource, the target feature description information may further indicate an association between each piece of cluster description information and the remaining cluster description information. Therefore, the target feature description information is more representative for the multimedia resource. Further, when classifying the multimedia resource based on the target feature description information, the computer device may obtain a classification result with higher accuracy, thereby improving performance of multimedia resource classification.

Figure 3:
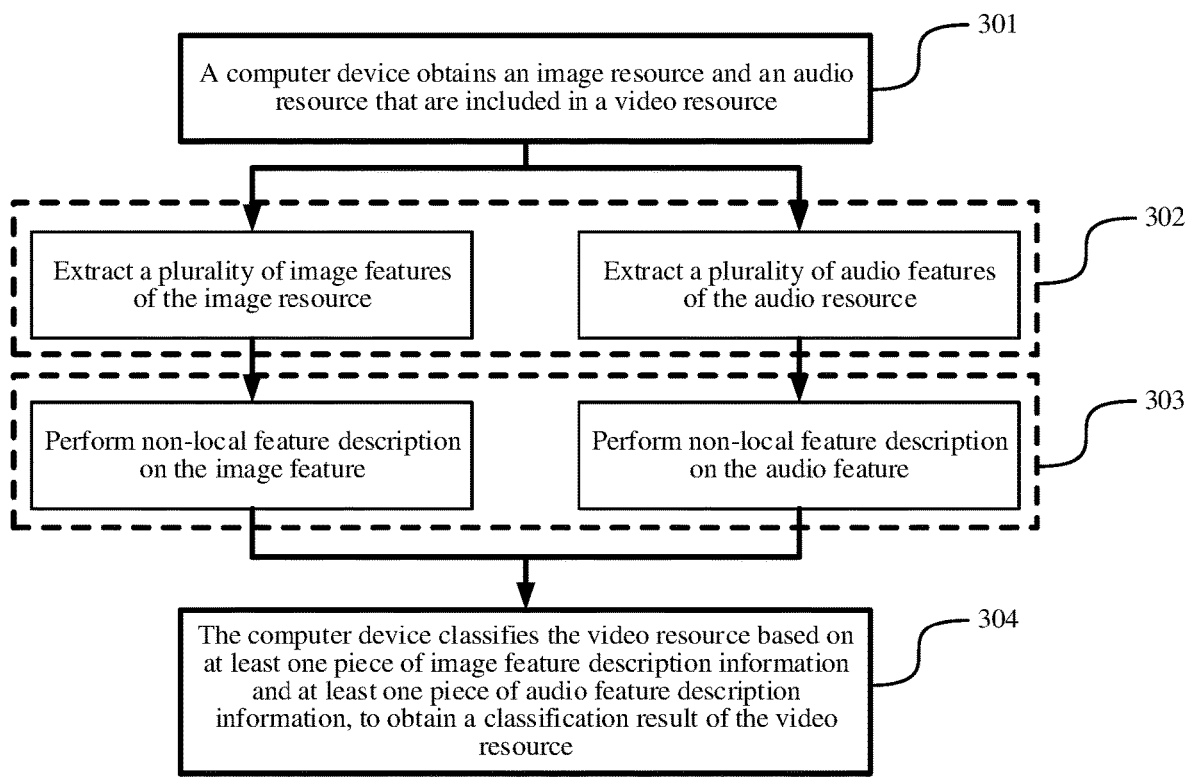
FIG. 3 is a flowchart of a multimedia resource classification method according to an embodiment of this application.

The following describes a process of a video resource classification method with reference to the flowchart of a multimedia resource classification method shown in FIG. 3 by using an example in which the multimedia resource is a video resource. The processing procedure of the method may include the following steps:

301: The computer device obtains an image resource and an audio resource that are included in the video resource.

The video resource may include the image resource and the audio resource. The image resource may include at least one frame of image, and the audio resource may also include at least one frame of audio signal. For example, a video resource whose duration is one second may include 25 frames of images and audio signals. When the computer device triggers a process of classifying the video resource, the image resource and the audio resource in the video resource may be separately obtained.

302: The computer device separately extracts a plurality of image features of the image resource and a plurality of audio features of the audio resource.

In some embodiments, a method for extracting the image feature may be different from a method for extracting the audio feature.

For example, the computer device may extract the feature of the image resource by using an Inception-V4 deep convolutional neural network model. A model parameter of the Inception-V4 model may be pre-trained according to an ImageNet dataset. When extracting the image feature, the computer device may input T frames of images in the image resource into the Inception-V4 model, and calculate by using a parameter, a convolution, a nonlinear activation function, and the like in the network, to output an image feature $\{x_{video}^t\}_{t=1}^T$ of each frame of image. After being processed by a principal component analysis algorithm, the image feature may have 1028 dimensions, and T may be an integer.

The computer device may extract the feature of the audio resource by using a VGGish deep convolutional neural network model. A model parameter of the VGGish model may be pre-trained according to an AudioSet dataset. Similar to the image feature extraction, after feature extraction is performed on T frames of audio signals, an audio feature $\{x_{video}^t\}_{t=1}^T$ of each frame of audio signal may be obtained, and the audio feature may have 128 dimensions. The VGGish model is an audio signal classification model based on a visual geometry group (VGG) convolutional neural network.

In some embodiments, there is a relatively small difference between image resources in adjacent frames of the video resource, and a feature similarity is relatively high.

The audio resource is similar to the image resource. Therefore, the computer device performs the classification process based on the sampled video resource. Correspondingly, specific processing of step 302 may be as follows: sampling the multimedia resource to obtain at least one frame of the multimedia resource, and extracting a plurality of features of the at least one frame of the multimedia resource.

The multimedia resource includes the image resource and the audio resource of the video resource, so that the image resource and the audio resource may both be sampled. For example, a sampling frequency may be one frame per second. A sampling frequency of the image resource and a sampling frequency of the audio resource may be the same or may be different. A specific sampling frequency is not limited in this embodiment of this application. By sampling the video resource, information redundancy can be reduced, processing efficiency can be improved, and processing resources can be saved.

303: The computer device separately performs non-local feature description on the image feature and the audio feature, to obtain at least one piece of image feature description information and at least one piece of audio feature description information.

Non-local feature description of the image feature and the audio feature is similar to the foregoing steps 202 and 203. In the non-local feature description process, a time sequence is not required for inputted feature. In addition, reference may not be made to time information in the calculation process. The target feature description information obtained based on the non-local feature description is irrelevant to the frame in which an image or an audio signal is located. Therefore, the target feature description information may be used for describing a feature of the video resource rather than a feature of a frame. That is, the target feature description information may be a feature descriptor in a video level. As compared with obtaining target feature description information for each frame, a required data amount is less, thereby saving storage space.

304: The computer device classifies the video resource based on the at least one piece of image feature description information and the at least one piece of audio feature description information, to obtain a classification result of the video resource.

The computer device may use the image feature description information and the audio feature description information as input, and a classification process is similar to the foregoing step 204. The classification result of the video resource is determined based on the image feature description information and the audio feature description information together.

In some embodiments, the computer device may alternatively use any one of the image feature description information or the audio feature description information as input. This is not limited in this embodiment of this application.

In this embodiment of this application, the computer device may separately perform feature extraction and non-local feature description on the image resource and the audio resource of the video resource, to obtain the target feature description information in the video level. In addition to improving classification accuracy, obtaining the target feature description information for each frame may be further avoided, thereby reducing a data amount of the target feature description information of the video resource, saving storage space, and improving processing efficiency.

Figure 4:
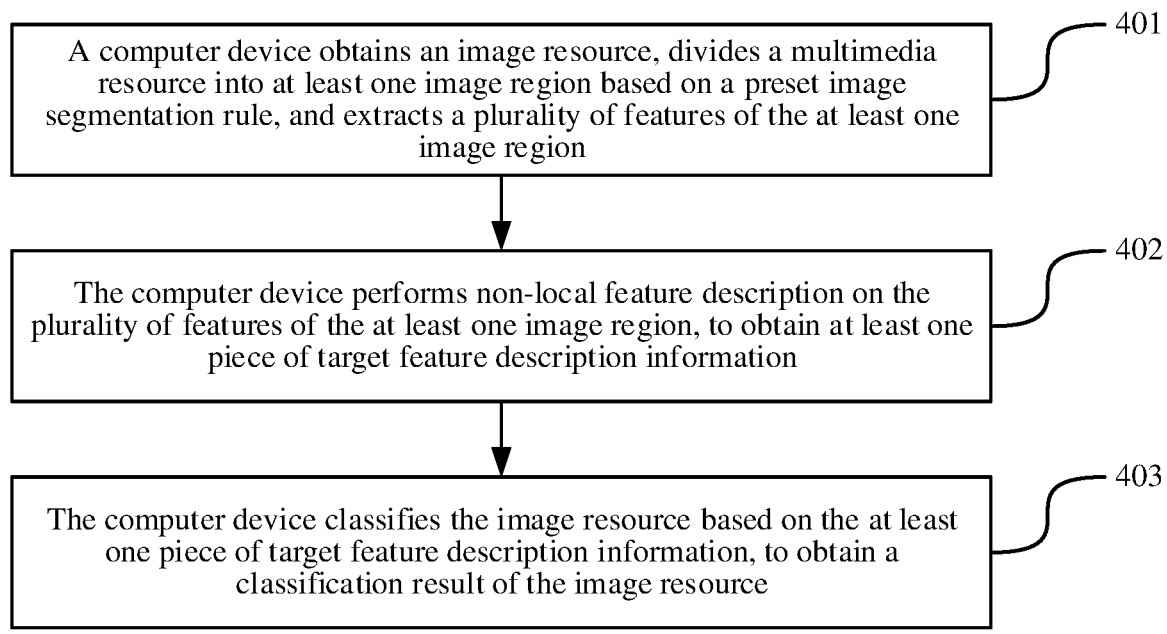
FIG. 4 is a flowchart of a multimedia resource classification method according to an embodiment of this application.

The following describes a process of an image resource classification method with reference to the flowchart of a multimedia resource classification method shown in FIG. 4 by using an example in which the multimedia resource is an image resource. The processing procedure of the method may include the following steps:

401: The computer device obtains an image resource, divides the multimedia resource into at least one image region based on a preset image segmentation rule, and extracts a plurality of features of the at least one image region.

In some embodiments, for an image resource of a relatively large pixel size, complexity of feature extraction is relatively high. Therefore, the computer device may segment the image resource and then perform feature extraction.

The image segmentation rule may be average segmentation, pyramid segmentation, and the like. Certainly, the image segmentation rule may also be a rule obtained by combining a plurality of segmentation manners. For example, a plurality of pyramid images is obtained by segmenting the image resource in the pyramid segmentation manner, and then average segmentation is performed on the pyramid images. A specific image segmentation rule is not limited in this embodiment of this application.

Similar to the foregoing feature extraction process for the image resource in the video resource, after feature extraction is performed on N image regions, feature $\{x_{image}^n\}_{n=1}^N$ of each image region may be obtained.

402: The computer device performs non-local feature description on the plurality of features of the at least one image region, to obtain at least one piece of target feature description information.

Similar to the foregoing step 303, in the non-local feature description process, a space sequence is not required for inputted feature. In addition, reference may not be made to space information in the calculation process. The target feature description information obtained based on the non-local feature description is irrelevant to the region in which an image is located. Therefore, the target feature description information may be used for describing a feature of the image resource rather than a feature of an image region. That is, the target feature description information may be a feature descriptor in an image level. As compared with obtaining target feature description information for each image region, a required data amount is less, thereby saving storage space.

403: The computer device classifies the image resource based on the at least one piece of target feature description information, to obtain a classification result of the image resource.

In this embodiment of this application, after performing feature extraction and non-local feature description on the image resource, the computer device may obtain the target feature description information in the image level. In addition to improving classification accuracy, obtaining the target feature description information for each image region may further be avoided, thereby reducing a data amount of the target feature description information of the image resource, saving storage space, and improving processing efficiency.

Figure 5:
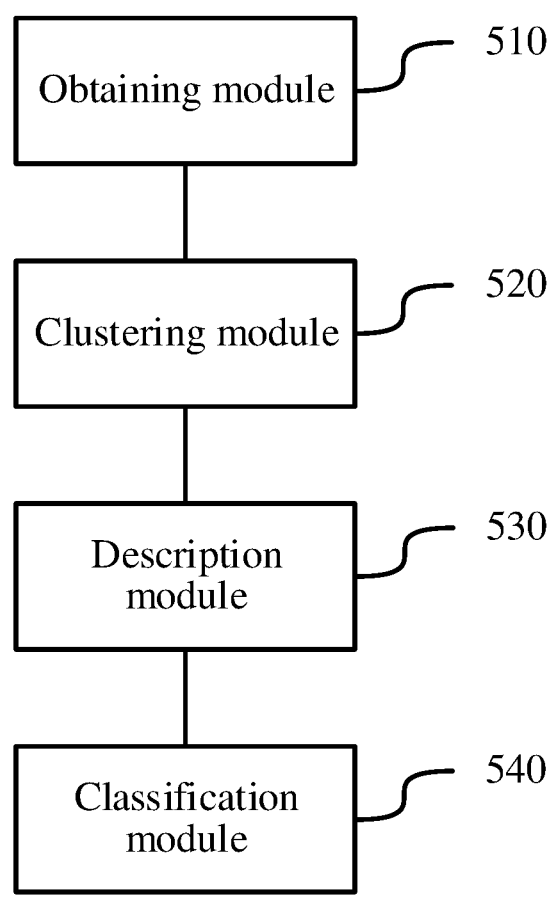
FIG. 5 is a schematic diagram of a multimedia resource classification apparatus according to an embodiment of this application.

Based on the same technical concept, an embodiment of this application further provides a multimedia resource classification apparatus. The apparatus may be the computer device in the foregoing embodiment. FIG. 5 is a schematic diagram of a multimedia resource classification apparatus. As shown in FIG. 5, the apparatus includes:

an obtaining module 510, configured to obtain a multimedia resource, and extract a plurality of features of the multimedia resource;

a clustering module 520, configured to cluster the plurality of features to obtain at least one cluster set, and determine cluster description information of each cluster set, the each cluster set including at least feature, and each piece of cluster description information being used for indicating a feature of one cluster set;

a description module 530, configured to determine at least one piece of target feature description information of the multimedia resource based on the cluster description information of each cluster set, each piece of target feature description information being used for representing an association between one piece of cluster description information and the remaining cluster description information; and a classification module 540, configured to classify the multimedia resource based on the at least one piece of target feature description information of the multimedia resource, to obtain a classification result of the multimedia resource.

Optionally, the description module 530 is configured to:

determine, for each piece of cluster description information, first association information of the each piece of cluster description information, each piece of first association information being used for representing an association between the each piece of cluster description information and the remaining cluster description information; and determine the at least one piece of target feature description information of the multimedia resource based on the first association information of each piece of cluster description information.

Optionally, the description module 530 is configured to:

obtain at least one piece of first sub-association information of first cluster description information, each piece of first sub-association information being used for representing an association between the first cluster description information and one piece of second cluster description information, the first cluster description information being any one piece of cluster description information, and the second cluster description information being any one piece of information other than the first cluster description information in the at least one piece of cluster description information; and obtain first association information of the first cluster description information according to the at least one piece of first sub-association information and at least one piece of second cluster description information.

Optionally, the description module 530 is configured to:

merge the first association information of the first cluster description information and the first cluster description information, and output the target feature description information of the multimedia resource.

Optionally, the multimedia resource is a video resource, and the obtaining module 510 is configured to: obtain an image resource and an audio resource that are included in the multimedia resource; and separately extract a plurality of image features of the image resource and a plurality of audio features of the audio resource.

Optionally, the multimedia resource is a video resource, and the obtaining module 510 is configured to: sample the multimedia resource to obtain at least one frame of the multimedia resource, and extract a plurality of features of the at least one frame of the multimedia resource.

Optionally, the multimedia resource is an image resource, and the obtaining module 510 is configured to: divide the multimedia resource into at least one image region based on a preset image segmentation rule, and extract a plurality of features of the at least one image region.

Optionally, the classification module 540 is configured to: calculate a classification probability of at least one type based on the at least one piece of target feature description information of the multimedia resource, and determine a type whose classification probability is greater than a preset threshold as the classification result of the multimedia resource.

Specific manners of performing operations by the modules of the apparatus in the foregoing embodiment are already described in detail in the embodiments related to the method.

In this embodiment of this application, when classifying the multimedia resource, the computer device may cluster a plurality of features of the multimedia resource to obtain at least one cluster set, then describe each cluster set by using cluster description information, and further describe the cluster description information based on an association between the cluster description information, to obtain target feature description information. In addition to describing a feature of each cluster set in the multimedia resource, the target feature description information may further indicate an association between each piece of cluster description information and the remaining cluster description information. Therefore, the target feature description information is more representative for the multimedia resource. Further, when classifying the multimedia resource based on the target feature description information, the computer device may obtain a classification result with higher accuracy, thereby improving performance of multimedia resource classification.

Division of the foregoing functional modules is only described for exemplary purposes when the multimedia resource classification apparatus provided in the foregoing embodiment classifies a multimedia resource. During actual application, the foregoing functions may be allocated, according to requirements, to be completed by different functional modules, that is, the internal structure of the computer device is divided into different functional modules, to complete all or some of the functions described above. In addition, the multimedia resource classification apparatus and multimedia resource classification method embodiments provided in the foregoing embodiments belong to one conception. For a specific implementation process, refer to the method embodiments.

Figure 6:
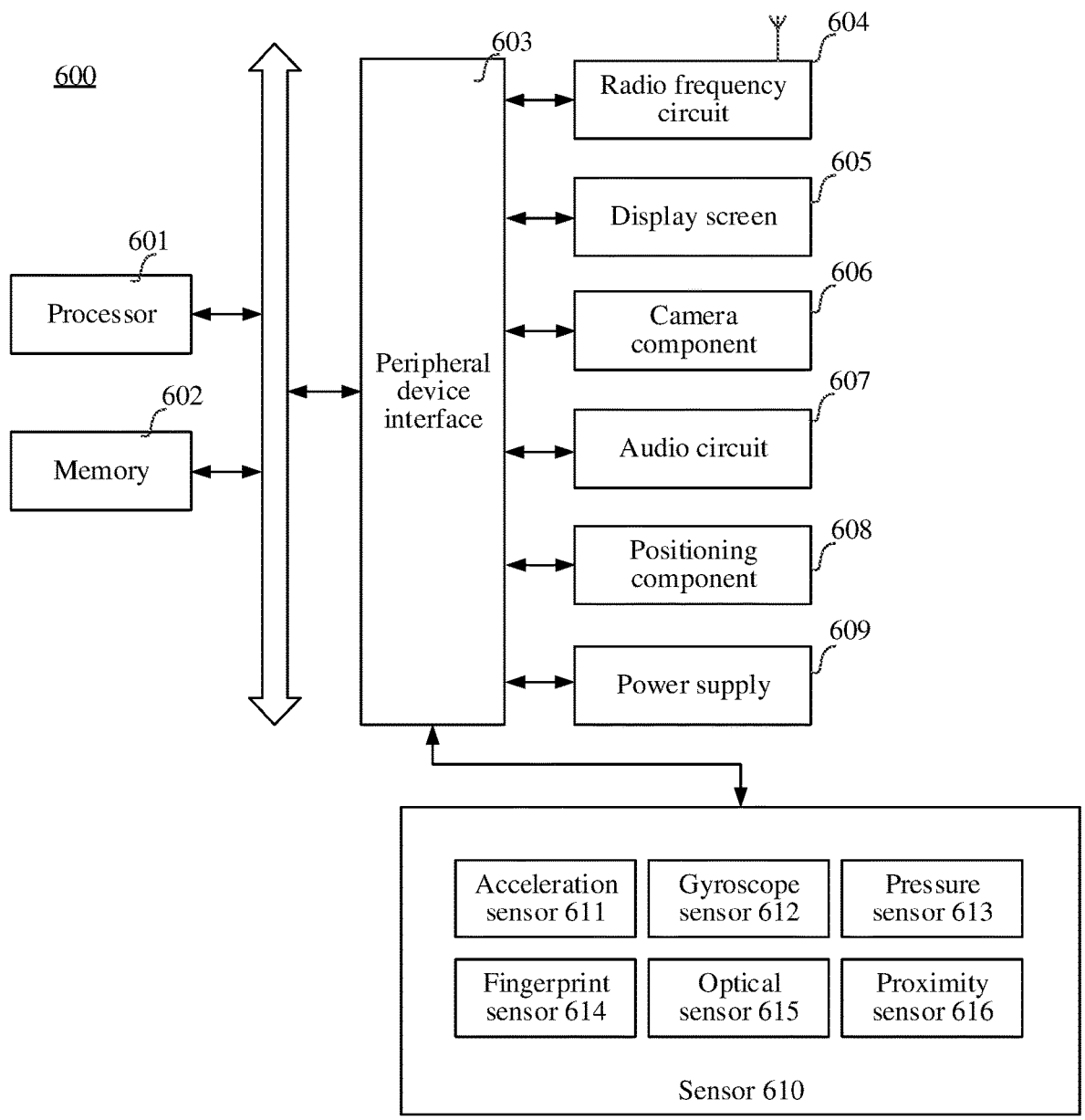
FIG. 6 is a schematic structural diagram of a terminal according to an embodiment of this application.
Figure 7:
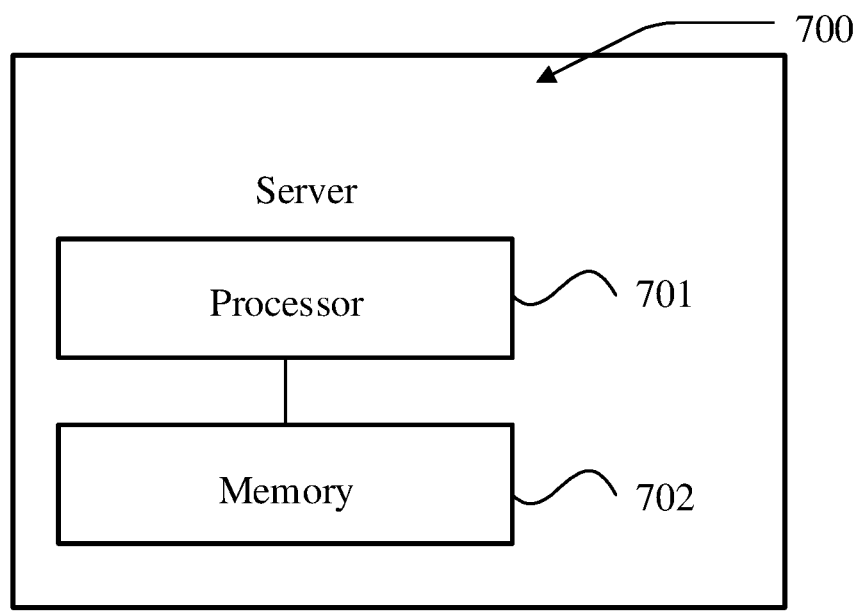
FIG. 7 is a schematic structural diagram of a server according to an embodiment of this application.

The computer device may be the terminal shown in FIG. 6, or may be the server shown in FIG. 7.

FIG. 6 is a schematic structural diagram of a terminal according to an embodiment of this application. The terminal 600 may be a smartphone, a tablet computer, a moving picture experts group audio layer III (MP3) player, a moving picture experts group audio layer IV (MP4) player, a notebook computer, or a desktop computer. The terminal 600 may also be referred to as user equipment, a portable terminal, a laptop terminal, a desktop terminal, or another name.

Generally, the terminal 600 includes a processor 601 and a memory 602.

The processor 601 may include one or more processing cores, for example, the processor 601 may be a 4-core processor or an 8-core processor. The processor 601 may be implemented in at least one hardware form of digital signal processing (DSP), a field-programmable gate array (FPGA), and a programmable logic array (PLA). The processor 601 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 601 may be integrated with a graphics processing unit (GPU). The GPU is configured to be responsible for rendering and drawing content to be displayed by a display screen. In some embodiments, the processor 601 may further include an artificial intelligence (AI) processor. The AI processor is configured to process a calculation operation related to machine learning.

The memory 602 may include one or more computer-readable storage media. The computer-readable storage medium may be non-transient. The memory 602 may further include a high-speed random access memory (RAM) and a non-volatile memory, for example, one or more magnetic disk storage devices or flash storage devices. In some embodiments, the non-transitory computer-readable storage medium in the memory 602 is configured to store at least one instruction, the at least one instruction being executed by the processor 601 to implement the multimedia resource classification method provided in the method embodiments of this application.

In some embodiments, the terminal 600 further optionally includes a peripheral device interface 603 and at least one peripheral device. The processor 601, the memory 602, and the peripheral device interface 603 may be connected through a bus or a signal cable. Each peripheral device may be connected to the peripheral device interface 603 through a bus, a signal cable, or a circuit board. Specifically, the peripheral device includes at least one of a radio frequency (RF) circuit 604, a touch display screen 605, a camera component 606, an audio circuit 607, a positioning component 608, and a power supply 609.

The peripheral device interface 603 may be configured to connect at least one peripheral device related to input/output (I/O) to the processor 601 and the memory 602. In some embodiments, the processor 601, the memory 602, and the peripheral device interface 603 are integrated into one chip or circuit board; in some other embodiments, any one or two of the processor 601, the memory 602, and the peripheral device interface 603 may be implemented on an independent chip or circuit board. This is not limited in this embodiment.

The RF circuit 604 is configured to receive and transmit an RF signal, which is also referred to as an electromagnetic signal. The RF circuit 604 communicates with a communication network and another communication device by using the electromagnetic signal. The RF circuit 604 converts an electrical signal into an electromagnetic signal for transmission, or converts a received electromagnetic signal into an electrical signal. Optionally, the RF circuit 604 includes at least one or more of an antenna system, an RF transceiver, one or more amplifiers, a tuner, an oscillator, a digital signal processor, a codec chipset, and a subscriber identity module card. The RF circuit 604 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (WiFi) network. In some embodiments, the RF circuit 604 may also include a circuit related to near field communication (NFC). This is not limited in this application.

The display screen 605 is configured to display a user interface (UI). The UI may include a graph, a text, an icon, a video, and any combination thereof. When the display screen 605 is a touch display screen, the display screen 605 is further capable of acquiring a touch signal on or above a surface of the display screen 605. The touch signal may be inputted, as a control signal, to the processor 601 for processing. In this case, the display screen 605 may be further configured to provide a virtual button and/or a virtual keyboard, which is also referred to as a soft button and/or a soft keyboard. In some embodiments, there may be one display screen 605, disposed on a front panel of the terminal 600. In some other embodiments, there may be at least two display screens 605, disposed on different surfaces of the terminal 600 respectively or in a folded design. In some more embodiments, the display screen 605 may be a flexible display screen, disposed on a curved surface or a folded surface of the terminal 600. Even, the display screen 605 may be further set to have a non-rectangular irregular graph, namely, a special-shaped screen. The display screen 605 may be made of a material such as a liquid crystal display (LCD) or an organic light-emitting diode (OLED).

The camera component 606 is configured to acquire an image or a video. Optionally, the camera component 606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 606 may further include a flash. The flash may be a single color temperature flash, or may be a double color temperature flash. The double color temperature flash is a combination of a warm light flash and a cold light flash, and may be used for light compensation under different color temperatures.

The audio circuit 607 may include a microphone and a speaker. The microphone is configured to: acquire sound waves of a user and an environment, and convert the sound waves into electrical signals and input the electrical signals into the processor 601 for processing, or input the electrical signals into the RF circuit 604 to implement speech communication. For the purpose of stereo collection or noise reduction, there may be a plurality of microphones, disposed at different portions of the terminal 600 respectively. The microphone may be further an array microphone or an omnidirectional collection microphone. The speaker is configured to convert electrical signals from the processor 601 or the RF circuit 604 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 607 may further include an earphone jack.

The positioning component 608 is configured to position a current geographic location of the terminal 600, to implement a navigation or a location based service (LBS). The positioning component 608 may be a positioning component based on the global positioning system (GPS) of the United States, the COMPASS System of China, the GLONASS System of Russia, or the GALILEO System of the European Union.

The power supply 609 is configured to supply power for various components in the terminal 600. The power supply 609 may be an alternating current, a direct current, a disposable battery, or a rechargeable battery. When the power supply 609 includes the rechargeable battery, the rechargeable battery may be a wired rechargeable battery or a wireless rechargeable battery. The rechargeable battery may further be configured to support a quick charge technology.

In some embodiments, the terminal 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect accelerations on three coordinate axes of a coordinate system established by the terminal 600. For example, the acceleration sensor 611 may be configured to detect components of gravity acceleration on the three coordinate axes. The processor 601 may control, according to a gravity acceleration signal collected by the acceleration sensor 611, the touch display screen 605 to display the UI in a transverse view or a longitudinal view. The acceleration sensor 611 may be further configured to collect motion data of a game or a user.

The gyroscope sensor 612 may detect a body direction and a rotation angle of the terminal 600. The gyroscope sensor 612 may cooperate with the acceleration sensor 611 to collect a 3D action by the user on the terminal 600. The processor 601 may implement the following functions according to the data collected by the gyroscope sensor 612: motion sensing (such as changing the UI according to a tilt operation of the user), image stabilization during shooting, game control, and inertial navigation.

The pressure sensor 613 may be disposed on a side frame of the terminal 600 and/or a lower layer of the touch display screen 605. When the pressure sensor 613 is disposed on the side frame of the terminal 600, a holding signal of the user to the terminal 600 may be detected, and left/right hand identification and a quick operation may be performed by the processor 601 according to the holding signal collected by the pressure sensor 613. When the pressure sensor 613 is disposed on the lower layer of the touch display screen 605, the processor 601 controls an operable control on the UI interface according to a pressure operation of the user on the touch display screen 605. The operable control includes at least one of a button control, a scroll bar control, an icon control, and a menu control.

The fingerprint sensor 614 is configured to collect a user's fingerprint, and the processor 601 identifies a user's identity according to the fingerprint collected by the fingerprint sensor 614, or the fingerprint sensor 614 identifies the user's identity according to the collected fingerprint. When identifying that the user's identity is a trusted identity, the processor 601 authorizes the user to perform related sensitive operations. The sensitive operations include: unlocking the screen, viewing encrypted information, downloading software, paying, changing a setting, and the like. The fingerprint sensor 614 may be disposed on a front surface, a back surface, or a side surface of the terminal 600. When a physical button or a vendor logo is disposed on the terminal 600, the fingerprint sensor 614 may be integrated with the physical button or the vendor logo.

The optical sensor 615 is configured to collect ambient light intensity. In an embodiment, the processor 601 may control display luminance of the touch display screen 605 according to the ambient light intensity collected by the optical sensor 615. Specifically, when the ambient light intensity is relatively high, the display luminance of the touch display screen 605 is increased. When the ambient light intensity is relatively low, the display luminance of the touch display screen 605 is reduced. In another embodiment, the processor 601 may further dynamically adjust a camera parameter of the camera component 606 according to the ambient light intensity collected by the optical sensor 615.

The proximity sensor 616, also referred to as a distance sensor, is generally disposed on the front panel of the terminal 600. The proximity sensor 616 is configured to collect a distance between a user and the front surface of the terminal 600. In an embodiment, when the proximity sensor 616 detects that the distance between the user and the front surface of the terminal 600 gradually decreases, the touch display screen 605 is controlled by the processor 601 to switch from a screen-on state to a screen-off state. When the proximity sensor 616 detects that the distance between the user and the front surface of the terminal 600 gradually increases, the touch display screen 605 is controlled by the processor 601 to switch from the screen-off state to the screen-on state.

A person skilled in the art may understand that the structure shown in FIG. 6 does not constitute a limitation on the terminal 600, and the terminal may include more or fewer components than those shown in the figure, or some components may be combined, or a different component deployment may be used.

FIG. 7 is a schematic structural diagram of a server according to an embodiment of this application. The server 700 may vary greatly due to different configurations or performance, and may include one or more central processing units (CPUs) 701 and one or more memories 702. The memory 702 stores at least one instruction, the at least one instruction being loaded and executed by the processor 701 to implement the steps of the multimedia resource classification method, for example, to perform the following steps:

obtaining a multimedia resource, and extracting a plurality of features of the multimedia resource;

clustering the plurality of features to obtain at least one cluster set, and determining cluster description information of each cluster set, the each cluster set including at least feature, and each piece of cluster description information being used for indicating a feature of one cluster set;

determining at least one piece of target feature description information of the multimedia resource based on the cluster description information of each cluster set, each piece of target feature description information being used for representing an association between one piece of cluster description information and the remaining cluster description information; and classifying the multimedia resource based on the at least one piece of target feature description information of the multimedia resource, to obtain a classification result of the multimedia resource.

In this embodiment of this application, when classifying the multimedia resource, the computer device may cluster a plurality of features of the multimedia resource to obtain at least one cluster set, then describe each cluster set by using cluster description information, and further describe the cluster description information based on an association between the cluster description information, to obtain target feature description information. In addition to describing a feature of each cluster set in the multimedia resource, the target feature description information may further indicate an association between each piece of cluster description information and the remaining cluster description information. Therefore, the target feature description information is more representative for the multimedia resource. Further, when classifying the multimedia resource based on the target feature description information, the computer device may obtain a classification result with higher accuracy, thereby improving performance of multimedia resource classification.

In an exemplary embodiment, a computer-readable storage medium, such as a memory including an instruction, is further provided, and the instruction may be executed by the processor in the server to complete the multimedia resource classification method. For example, the computer-readable storage medium may be a read-only memory (ROM), a random access memory (RAM), a CD-ROM, a magnetic tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, or an optical disc.

It is to be understood that the steps in the embodiments of this application are not necessarily performed according to a sequence indicated by step numbers. Unless explicitly specified in this application, execution of the steps is not strictly limited, and the steps may be performed in another sequence. Moreover, at least some of the steps in the embodiments may include a plurality of sub-steps or a plurality of stages. The sub-steps or stages are not necessarily performed at the same moment, but may be performed at different moments. The sub-steps or stages are not necessarily sequentially performed, but may be performed in turn or alternately with other steps or at least some sub-steps or stages of other steps.

A person of ordinary skill in the art may understand that all or some of the procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for classifying a multimedia resource, the method comprising:

obtaining, by a device comprising a memory storing instructions and a processor in communication with the memory, a multimedia resource;

inputting, by the device, the multimedia resource to a convolutional neural network model to extract a plurality of features of the multimedia resource;

executing, by the device, a machine learning model to perform non-local feature description on the multimedia resource by:

clustering the plurality of features to obtain at least one cluster set, and determining cluster description information of each cluster set, the each cluster set comprising at least one feature of the multimedia resource, and each piece of cluster description information being used for indicating a feature of one cluster set;

determining for each piece of cluster description information, first association information of the each piece of cluster description information, each piece of first association information being used for representing an association between the each piece of cluster description information and the remaining cluster description information, obtaining at least one piece of first sub-association information of first cluster description information, each piece of first sub-association information being used for representing an association between the first cluster description information and one piece of second cluster description information, the first cluster description information being any one piece of cluster description information, and the second cluster description information being any one piece of information other than the first cluster description information in the at least one piece of cluster description information, wherein the obtaining at least one piece of first sub-association information of first cluster description information comprises applying a learnable parameter of the machine learning model;

obtaining first association information of the first cluster description information according to the at least one piece of first sub-association information and at least one piece of second cluster description information; and determining at least one piece of target feature description information of the multimedia resource based on the cluster description information of each cluster set and the first association information, each piece of target feature description information being used for representing an association between one piece of cluster description information and the remaining cluster description information; and classifying, by the device, the multimedia resource based on the at least one piece of target feature description information of the multimedia resource, to obtain a classification result of the multimedia resource.

2. The method according to claim 1, wherein the determining at least one piece of target feature description information of the multimedia resource based on the cluster description information of each cluster set comprises:

determining, by the device, the at least one piece of target feature description information of the multimedia resource based on the first association information of each piece of cluster description information.

3. The method according to claim 2, wherein the determining the at least one piece of target feature description information of the multimedia resource based on the first association information of each piece of cluster description information comprises: merging, by the device, the first association information of the first cluster description information and the first cluster description information, and outputting, by the device, the target feature description information of the multimedia resource.

4. The method according to claim 1, wherein:
the multimedia resource is a video resource; and
the extracting the plurality of features of the multimedia resource comprises:
obtaining, by the device, an image resource and an audio resource that are comprised in the multimedia resource, and
separately extracting, by the device, a plurality of image features of the image resource and a plurality of audio features of the audio resource as the plurality of features of the multimedia resource.

5. The method according to claim 1, wherein:
the multimedia resource is a video resource; and
the extracting the plurality of features of the multimedia resource comprises:
sampling, by the device, the multimedia resource to obtain at least one frame of the multimedia resource, and
extracting, by the device, the plurality of features of the at least one frame of the multimedia resource.

6. The method according to claim 1, wherein the classifying the multimedia resource based on the at least one piece of target feature description information of the multimedia resource, to obtain the classification result of the multimedia resource comprises:
obtaining, by the device, a classification probability of at least one type based on the at least one piece of target feature description information of the multimedia resource; and
determining, by the device, a type whose classification probability is greater than a preset threshold as the classification result of the multimedia resource.

7. An apparatus for classifying a multimedia resource, the apparatus comprising:
a memory storing instructions; and
a processor in communication with the memory, wherein, when the processor executes the instructions, the processor is configured to cause the apparatus to:
obtain a multimedia resource,
input the multimedia resource to a convolutional neural network model to extract a plurality of features of the multimedia resource,
execute a machine learning model to perform non-local feature description on the multimedia resource by:
clustering the plurality of features to obtain at least one cluster set, and determine cluster description information of each cluster set, the each cluster set comprising at least one feature of the multimedia resource, and each piece of cluster description information being used for indicating a feature of one cluster set,
determining, for each piece of cluster description information, first association information of the each piece of cluster description information, each piece of first association information being used for representing an association between the each piece of cluster description information and the remaining cluster description information,
obtaining at least one piece of first sub-association information of first cluster description information, each piece of first sub-association information being used for representing an association between the first cluster description information and one piece of second cluster description information, the first cluster description information being any one piece of cluster description information, and the second cluster description information being any one piece of information other than the first cluster description information in the at least one piece of cluster description information, wherein the obtaining at least one piece of first sub-association information of first cluster description information comprises applying a learnable parameter of the machine learning model,
obtaining first association information of the first cluster description information according to the at least one piece of first sub-association information and at least one piece of second cluster description information, and
determining at least one piece of target feature description information of the multimedia resource based on the cluster description information of each cluster set and the first association information, each piece of target feature description information being used for representing an association between one piece of cluster description information and the remaining cluster description information, and
classify the multimedia resource based on the at least one piece of target feature description information of the multimedia resource, to obtain a classification result of the multimedia resource.

8. The apparatus according to claim 7, wherein, when the processor is configured to cause the apparatus to determine at least one piece of target feature description information of the multimedia resource based on the cluster description information of each cluster set, the processor is configured to cause the apparatus to:
determine the at least one piece of target feature description information of the multimedia resource based on the first association information of each piece of cluster description information.

9. The apparatus according to claim 8, wherein, when the processor is configured to cause the apparatus to determine the at least one piece of target feature description information of the multimedia resource based on the first association information of each piece of cluster description information, the processor is configured to cause the apparatus to: merge the first association information of the first cluster description information and the first cluster description information, and output the target feature description information of the multimedia resource.

10. The apparatus according to claim 7, wherein:
the multimedia resource is a video resource; and
when the processor is configured to cause the apparatus to extract the plurality of features of the multimedia resource, the processor is configured to cause the apparatus to:
obtain an image resource and an audio resource that are comprised in the multimedia resource, and
separately extract a plurality of image features of the image resource and a plurality of audio features of the audio resource as the plurality of features of the multimedia resource.

11. The apparatus according to claim 7, wherein:
the multimedia resource is a video resource; and
when the processor is configured to cause the apparatus to extract the plurality of features of the multimedia resource, the processor is configured to cause the apparatus to:
sample the multimedia resource to obtain at least one frame of the multimedia resource, and
extract the plurality of features of the at least one frame of the multimedia resource.

12. The apparatus according to claim 7, wherein, when the processor is configured to cause the apparatus to classify the multimedia resource based on the at least one piece of target feature description information of the multimedia resource, to obtain the classification result of the multimedia resource, the processor is configured to cause the apparatus to:
obtain a classification probability of at least one type based on the at least one piece of target feature description information of the multimedia resource; and
determine a type whose classification probability is greater than a preset threshold as the classification result of the multimedia resource.

13. A non-transitory computer readable storage medium storing computer readable instructions, wherein, the computer readable instructions, when executed by a processor, are configured to cause the processor to perform:
obtaining a multimedia resource;
inputting the multimedia resource to a convolutional neural network model to extract a plurality of features of the multimedia resource;
executing a machine learning model to perform non-local feature description on the multimedia resource by:
clustering the plurality of features to obtain at least one cluster set, and determining cluster description information of each cluster set, the each cluster set comprising at least one feature of the multimedia resource, and each piece of cluster description information being used for indicating a feature of one cluster set;
determining, for each piece of cluster description information, first association information of the each piece of cluster description information, each piece of first association information being used for representing an association between the each piece of cluster description information and the remaining cluster description information;
obtaining at least one piece of first sub-association information of first cluster description information, each piece of first sub-association information being used for representing an association between the first cluster description information and one piece of second cluster description information, the first cluster description information being any one piece of cluster description information, and the second cluster description information being any one piece of information other than the first cluster description information in the at least one piece of cluster description information, wherein the obtaining at least one piece of first sub-association information of first cluster description information comprises applying a learnable parameter of a machine learning model;
obtaining first association information of the first cluster description information according to the at least one piece of first sub-association information and at least one piece of second cluster description information; and determining at least one piece of target feature description information of the multimedia resource based on the cluster description information of each cluster set, each piece of target feature description information being used for representing an association between one piece of cluster description information and the remaining cluster description information; and
classifying the multimedia resource based on the at least one piece of target feature description information of the multimedia resource, to obtain a classification result of the multimedia resource.

14. The non-transitory computer readable storage medium according to claim 13, wherein, when the computer readable instructions are configured to cause the processor to perform determining at least one piece of target feature description information of the multimedia resource based on the cluster description information of each cluster set, the computer readable instructions are configured to cause the processor to perform:
determining the at least one piece of target feature description information of the multimedia resource based on the first association information of each piece of cluster description information.

15. The non-transitory computer readable storage medium according to claim 14, wherein, when the computer readable instructions are configured to cause the processor to perform determining the at least one piece of target feature description information of the multimedia resource based on the first association information of each piece of cluster description information, the computer readable instructions are configured to cause the processor to perform: merging the first association information of the first cluster description information and the first cluster description information, and outputting the target feature description information of the multimedia resource.

16. The non-transitory computer readable storage medium according to claim 13, wherein:
the multimedia resource is a video resource; and
when the computer readable instructions are configured to cause the processor to perform extracting the plurality of features of the multimedia resource, the computer readable instructions are configured to cause the processor to perform:
obtaining an image resource and an audio resource that are comprised in the multimedia resource, and
separately extracting a plurality of image features of the image resource and a plurality of audio features of the audio resource as the plurality of features of the multimedia resource.

17. The non-transitory computer readable storage medium according to claim 13, wherein:
the multimedia resource is a video resource; and
when the computer readable instructions are configured to cause the processor to perform extracting the plurality of features of the multimedia resource, the computer readable instructions are configured to cause the processor to perform:
sampling the multimedia resource to obtain at least one frame of the multimedia resource, and
extracting the plurality of features of the at least one frame of the multimedia resource.

18. The non-transitory computer readable storage medium according to claim 13, wherein, when the computer readable instructions are configured to cause the processor to perform extracting the plurality of features of the multimedia resource, the computer readable instructions are configured to cause the processor to perform:

obtaining a classification probability of at least one type based on the at least one piece of target feature description information of the multimedia resource; and determining a type whose classification probability is greater than a preset threshold as the classification result of the multimedia resource.

\* \* \* \* \*